United States Patent [19] [11] 4,329,142
Dyer [45] May 11, 1982

[54] METHOD FOR HEAT TREATMENT OF CLAY AND REFRACTORY WARE
[75] Inventor: Anthony O. Dyer, Wetherby, England
[73] Assignee: BOC Limited, London, England
[21] Appl. No.: 158,185
[22] Filed: Jun. 10, 1980
[30] Foreign Application Priority Data
Jun. 18, 1979 [GB] United Kingdom ............... 7921192
Mar. 26, 1980 [GB] United Kingdom ............... 8010115
[51] Int. Cl.$^3$ .......................... F27D 7/00; F27B 9/04; F27B 9/00
[52] U.S. Cl. ....................................... 432/19; 432/23; 432/144
[58] Field of Search ....................... 432/19, 23, 25, 26, 432/144, 145, 146

[56] References Cited
U.S. PATENT DOCUMENTS
3,459,412 8/1969 Fries et al. ............................. 432/23
FOREIGN PATENT DOCUMENTS
2754766 6/1978 Fed. Rep. of Germany .
138358 10/1979 Fed. Rep. of Germany ...... 432/144

Primary Examiner—John J. Camby
Attorney, Agent, or Firm—David L. Rae; Larry R. Cassett; Edmund W. Bopp

[57] ABSTRACT

In the manufacture of clay or refractory ware containing oxidizable material, stacks of the ware are passed through a tunnel kiln and a flow of air passed over the stacks. Fuel burners are operated to provide the necessary stages for firing the ware. These stages include an oxidation stage in which residual oxidizable material is oxidized. Gas containing more oxygen than air (i.e. commercially pure oxygen or oxygen-enriched air) is introduced into the region of the kiln where the oxidation takes place. The oxygen-rich gas is caused to penetrate at least one stack for the time being in the oxidation region so as to increase the concentration of oxygen throughout the individual items of ware within said stack. It is thus possible to oxidize all the residual oxidizable material. At least 50% of such oxidation is typically confined to a temperature range of 100° C. The heat thereby released assists in the firing of the ware.

9 Claims, 19 Drawing Figures

METHOD FOR HEAT TREATMENT OF CLAY AND REFRACTORY WARE

BACKGROUND OF THE INVENTION

This invention relates to a method for the heat treatment of clay and refractory ware. The invention is particularly concerned with the firing of clay (and refractory) ware containing oxidisable material in a tunnel kiln through which the ware is advanced generally horizontally. The clay may be a heavy clay from which, for example, bricks are formed, or may be a carbonaceous fireclay from which refractories are formed.

Clay from which such products as bricks, tiles, pipes and sanitary ware are formed typically has a moisture content of 2% by weight (excluding chemically combined water of crystallisation). It also typically contains significant proportions of carbonaceous material and sulphur compounds. Its main constituent, however, is aluminium silicate which may take one of a number of forms. It also contains compounds of iron.

The firing of heavy clay ware involves several phases occuring at different temperatures but typically merging into one another. First, residual moisture is driven off at a temperature of up to about 150° C. Loss of water of crystallisation occurs typically between temperatures of 400°–600° C. Volatile organic compounds of carbon are driven off at relatively low temperatures to leave at 600° C. a residue of carbonaceous material that is relatively difficult to remove. Oxidation of this carbonaceous material typically starts in this range and may continue up to or above a temperature of around 900° C. When the clay ware has acquired such temperature, vitrification typically starts to take place and continues until a finishing temperature, typically of around 1100° C., has been reached. The ware is then cooled in the kiln to a temperature in the range 200°–400° C.

A tunnel kiln is designed with the aim of causing all these phases to take place in more or less successive regions of the kiln.

It is important to ensure that all carbonaceous material and sulphur compounds in the clay are expelled or oxidised before the vitrification phase starts. The presence of carbon or sulphur inhibits oxidation of iron compound in the clay. Incomplete oxidation, or "burn-out", of carbon before vitrification can lead to staining of the surface of the ware. Moreover, a deleterious black core is left in the centre of the ware. In extreme circumstances, distortion or bloating of the ware can occur when there is incomplete oxidation of the carbonaceous material.

In practice, difficulties can and do arise in achieving complete oxidation of carbon. These difficulties have lead to a considerable amount of research into the mechanism of oxidation of carbon during the firing of the clay ware. It has been found that the rate of oxidation increases with increasing oxygen concentration at a given temperature. It has further been found that at a given oxygen concentration the rate of oxidation increases with increasing temperature until the temperature at which vitrification takes place is reached. Oxidation will proceed as long as oxygen is available and can diffuse through the surface of the ware. Fusion of the outer layer of the ware during vitrification inhibits oxidation. An analogous problem of burn-out of carbon from heavy clay is associated with the manufacture of refractory ware. It is often necessary to apply an organic binder to the ware before firing in order to give it green strength. A carbon residue is produced within the ware on firing the organic binder. This residue generally needs to be oxidised before vitrification, and the rate of its removal depends on the partial pressure (or concentration) of oxygen in the kiln at the region where oxidation takes place.

Failure to complete oxidation of carbonaceous or organic material in the firing of clay or refractory ware is thus associated with depletion of oxygen in the kiln.

Typically, in operating a tunnel kiln, the ware is set either mechanically or by hand on cars which are passed through the kiln at a chosen rate. This rate, known as the "push-rate" determines the rate of production in the kiln. The ware is stacked on the cars in piles of predetermined dimensions. Often there are two or more piles in each car. Each pile is known as a "setting". The shapes of the settings, and the number of items of ware in each setting, and the spaces for circulation of air between individual items of ware are chosen according to the firing characteristics of the kiln and the properties of the clay or refractory from which the ware is formed. The necessary oxygen is supplied in part by air passed through the kiln counter-concurrently to the ware. The air flow is, however, required for other purposes including the supply of air to help support combustion of fuel passed to the kiln burners, the transfer of heat by convection from the burners to the ware, and the maintenance of a suitable temperature "profile" along the length of the kiln. In addition, it is desirable to keep to a minimum the volume of air passed to the stack of the kiln so as to keep down heat losses. Therefore, it is not generally possible in tackling the problem of obtaining complete oxidation of carbonaceous material to avoid causing other problems if the flow of air through the kiln is increased. Thus, in practice, the operators of tunnel kilns have tended to reach a compromise which, on occasions, entails formation of fired clay or refractory ware containing residual carbon or use of excessive air flows.

Failure to oxidise all the carbonaceous material in the clay arises not so much from a general lack of oxygen in the oxidation region of the kiln as from a local lack of oxygen within a setting at or towards its bottom. Thus, merely to introduce oxygen into the kiln, for example, in the manner described in German Offenlegungsschrift No. 2 754 766, is not in itself a solution to the problem of obtaining adequate oxidation of carbon without expending excessive thermal energy.

There is thus a clear need for an improved method for firing in a tunnel kiln clay or refractory ware containing oxidisable material whereby the oxidation of such material is facilitated without a concomittant requirement for the expenditure of an increased amount of thermal energy.

OBJECTS OF THE INVENTION

It is an object of the present invention to provide a method for firing clay (or refractory) ware containing oxidisable material in a tunnel kiln, in which the air flow is enriched locally in oxygen so as to provide satisfactory concentrations of oxygen for the oxidation of oxidisable material in the clay (or refractory) ware.

It is another object of the present invention to provide a method for firing clay (or refractory) ware containing oxidisable material in a tunnel kiln in which the requirements for fuel are reduced.

It is a further object of the present invention to provide a method for firing clay (or refractory) ware containing oxidisable material in a tunnel kiln in which improved use is made of the heat released to the ware from the oxidation of the oxidisable material (particularly carbonaceous material).

It is a still further object of the present invention to provide an improved method of firing bricks in a tunnel kiln.

Other objects of the present invention will become apparent from the following description of exemplary embodiments thereof particularly pointed out in the claims appended hereto.

THE INVENTION

According to the invention, there is provided a method for firing, in a tunnel kiln, clay (or refractory) ware containing oxidisable material which method includes the steps of:

(a) advancing stacks of the ware through the kiln;

(b) causing air to flow through the kiln;

(c) operating fuel burners to provide the necessary heat for the necessary stages of firing the ware (including an oxidation stage);

(d) introducing gas relatively rich in oxygen in comparison with air into a region of the kiln where oxidation of the oxidisable material takes place; and (e) causing at least some of the oxygen-rich gas to penetrate one or more stacks of ware for the time being in the oxidation region so as to increase throughout the or each said stack the concentration of oxygen in the gas mixture therein between individual items of ware.

The oxygen-rich gas is preferably commercially pure oxygen. Alternatively, oxygen-enriched air may be employed as the oxygen-rich gas.

In order to cause oxygen-rich gas to penetrate into a stack for the time being in the oxidation region of the kiln, one or more jets or streams of oxygen-rich gas may be directed at the stack at sufficiently high velocity for the or each jet or stream not to become generally mixed with the air flow before impinging upon the stack. If as is typical in the operation of tunnel kilns, a relatively narrow space (or channel) extending transversely to the longitudinal axis of the kiln is left between adjacent stacks, oxygen-rich gas may be introduced into this channel during at least part of the period when it is in the oxidation region of the kiln. Without such additions of oxygen there is a tendency for the atmosphere between stacks of bricks (or other ware) for the time being in the oxidation region to become relatively depleted in oxygen at the level of the bottom layers of bricks in the stack. Accordingly, there is a greater tendency for there to be inadequate oxidation of carbon in the bricks in these layers.

The spaces between stacks of bricks are known in intermittent-push kiln as firing dykes because the kiln burners fire into these spaces during the period in which the spaces are alongside the burners. Typically there may be a firing dyke on each side of each stack. Oxygen-rich gas may be introduced into firing dykes on both sides of a stack for at least part of the period during which it is in the oxidation region of the kiln. One or more jets or streams of oxygen-rich gas may be directed at high velocity into a firing dyke. Alternatively, the oxygen-rich gas may if desired be provided at a lower velocity from at least one suitable distributor (typically a pipe with several outlet orifices) extending into the firing dyke but retractable therefrom to allow kiln cars (on which the ware is stacked) to be advanced through the kiln. Oxygen-rich gas introduced into a firing dyke tends to infiltrate into adjacent stacks (particularly, with reference to the direction of flow of the air draft through the kiln, the one on the downstream side of the firing dyke). Creating turbulence within the firing dyke by the introduction of the oxygen-rich gas aids infiltration of the oxygen into the stacks.

If each kiln car on which the ware is stacked has passages which at one end terminate in the surface on which the ware is stacked and at the other end communicate with fuel-burners, oxygen-rich gas may be introducted into these passages during at least part of the period when the said kiln car is in the oxidation region so as to cause oxygen-rich gas to penetrate into a stack on the kiln car.

By adopting any of the above-mentioned methods of obtaining penetration of oxygen-rich gas into a stack of ware for the time being in the oxidation region of the kiln we believe it is possible to obtain relatively uniform concentrations of oxygen throughout the stack in the spaces between individual items of ware and thereby avoid low concentrations of oxygen particularly within the lower central region of the stack that can lead to inadequate oxidation of carbon within the ware.

Moreover, it becomes possible to reduce the air flow through the kiln and thus save fuel, or increase the rate of production, or to do both, without reducing oxygen concentrations in the oxidation region to levels at which inadequate oxidation of carbonaceous material occurs.

For optimum efficiency of operation of the kiln it is desirable for as much as possible of the oxidation of the oxidisable material to take place in a temperature range which is as narrow and as high as possible. In this way optimum use of the heat of oxidation of the oxidisable carbonaceous material in the ware can be made for the purpose of raising the temperature of the bricks thus counteracting any tendency for the ware (eg. bricks) within a stack to be at an unfavourably low temperature owing to the insulative effect of surrounding ware and thereby facilitating oxidation of the oxidisable (carbonaceous) material.

In order to confine as much as possible of the oxidation of the oxidisable material to a relatively narrow temperature range it is desirable that the kiln atmosphere at those lower temperatures outside the range at which significant oxidation of the oxidisable material is likely to take place is depleted in oxygen.

The method according to the invention may make it possible to form ware of a clay containing more carbon than is conventional. It also facilitates the firing of 'modular' bricks from carbonaceous shales. Modular bricks are those that are larger than conventionally sized bricks.

The method according to the present invention will now be described by way of example with reference to the accompanying drawings of which.

INTRODUCTION OF OXYGEN

Figure 1:
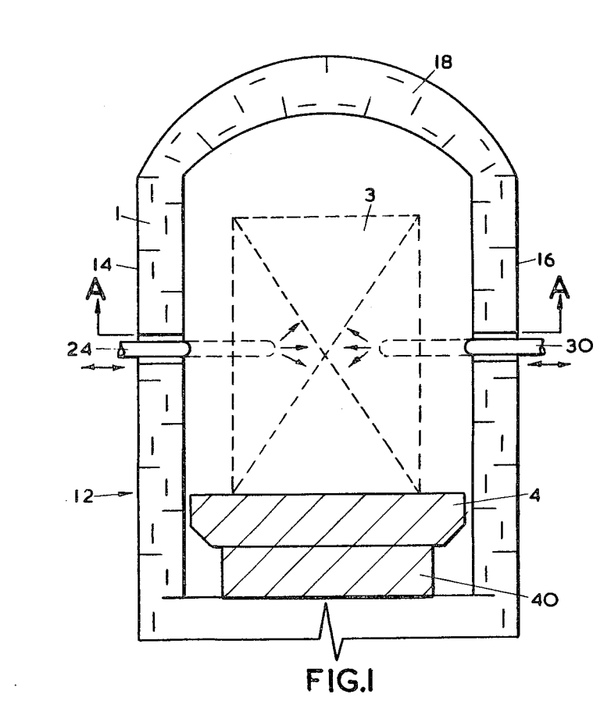
FIG. 1 is a schematic scrap view, in partly sectioned elevation, of a side-fired intermittent-push kiln fitted with oxygen lances.
Figure 2:
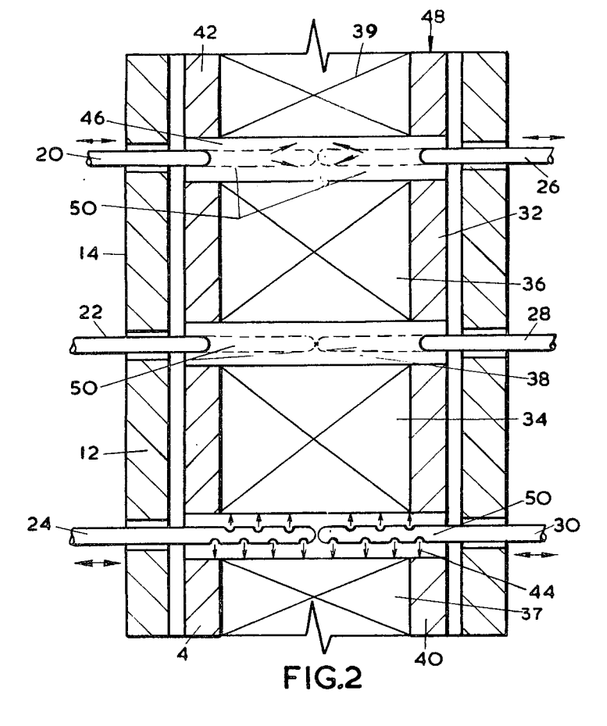
FIg. 2 is a section taken along part of the length of the kiln through the line A—A in FIG. 1.

Referring to FIGS. 1 and 2 of the drawings, an intermittent-push side-fired tunnel kiln 12 has side walls 14 and 16, a roof 18 and a floor (not shown).

The kiln is adapted for the firing of bricks. Clay bricks are passed therethrough on kiln cars and as they pass therethrough water is driven off, oxidisable material is oxidised and the clay from which the bricks are formed is vitrified.

A flow of air is introduced through the kiln so as to provide air for the combustion of the fuel and for other purposes mentioned hereinbefore. The air flows in the opposite direction to that in which the bricks are advanced. The air is heated by the kiln burners (not shown) as it passes through the kiln and is therefore able to supply the necessary heat for stages of the heat treatment cycle which take place before the bricks reach the region of the kiln where the burners are situated. In FIGS. 1 and 2 is illustrated a part of the kiln in which most of the carbon and other oxidisable material in the bricks is oxidised. This region is typically at a temperature in the range 750°-900° C. With reference to FIG. 2, oxygen lances 20, 22 and 24 extend through the wall 14 of the kiln 12. The lances 20, 22 and 24 are equally spaced apart. The spacing is related to the length of the kiln car. Typically, the space between the lance 20 and the lance 22 is half a kiln car's length, as is the space between the lances 22 and 24. Extending through the opposite side wall 16 of the kiln 12 are three lances 26, 28 and 30 which are complementary to the lances 20, 22 and 24. The lances 20 and 26 are opposite one another, as are the lances 22 and 28 and the lances 24 and 30. All the lances are at a level which is related to the height to which the bricks are stacked on the kiln car; the axes of the lances lie in a horizontal plane which bisects the stacks (see FIG. 1).

The setting of the bricks in the kiln cars is illustrated in FIGS. 1 and 2. In FIG. 2 is shown a kiln car 32. Two stacks of bricks 34 and 36 are seated on the kiln car 32. The stacks 34 and 36 are spaced apart, being separated by a transverse channel of firing dyke 38. Similar stacks of bricks are placed on each kiln car before it enters the kiln. In FIG. 2, the two kiln cars adjacent to the kiln car 32 are partially illustrated. The forward end of a rearward adjacent kiln car 40 is shown. Also shown in FIG. 2 is part of a stack 37 of bricks on the kiln car 40. In addition, the rear end of a kiln car 42 in front of the car 32 is shown in FIG. 2. On the kiln car 42 is a stack 39 of bricks. The space between the stack 37 and the stack 34 defines a firing dyke 44, and the space between the stack 36 and the stack 39 defines a firing dyke 46. All the stacks are of equal dimensions as are all the firing dykes.

The spacing of the lances relative to one another and the control of the advancement of the cars through the kiln is such that the lances are aligned with firing dykes when the kiln cars are stationary. Thus, as shown in FIG. 2, the lances 24 and 30 are aligned with the firing dyke 44; the lances 22 and 28 with the firing dyke 38, and the lances 20 and 26 with the firing dyke 46.

The lances are all associated with suitable manipulators (not shown) such that they can be moved into and out of the firing dyke. The lances as shown in FIG. 2 in retracted position but may be advanced into positions 50 as shown by the dotted line. The arrangement is such that the kiln cars cannot be advanced unless the lances are in their retracted positions.

The lances are adapted in operation to distribute oxygen up and down the full height of their associated firing dykes. Introduction of oxygen into the firing dykes creates turbulence, which, with the air currents created by the general flow of air through the kiln in the direction indicated by the arrow 48 causes oxygen-rich gas to penetrate the stacks adjacent the illustrated firing dykes. It is thus possible to achieve general enrichment in oxygen of the air trapped in the stacks between individual bricks. This aids oxidation of the carbon in the bricks. More of the oxygen from the lances 24 and 30 tends to penetrate the stack 37 than the stack 34, as a result of the general direction of air flow through the kiln; analogously more the oxygen from the lances 22 and 28 tends to penetrate the stack 34 than the stack 36. Also, analogously, more of the oxygen from the lances 20 and 26 tends to penetrate the stack 36 than the stack 39. However, this effect does not result in the ends of the stacks being depleted in oxygen as the turbulence created by the introduction of the oxygen into the firing dykes tends to a large degree to counteract the general air current in the kiln.

Figure 3:
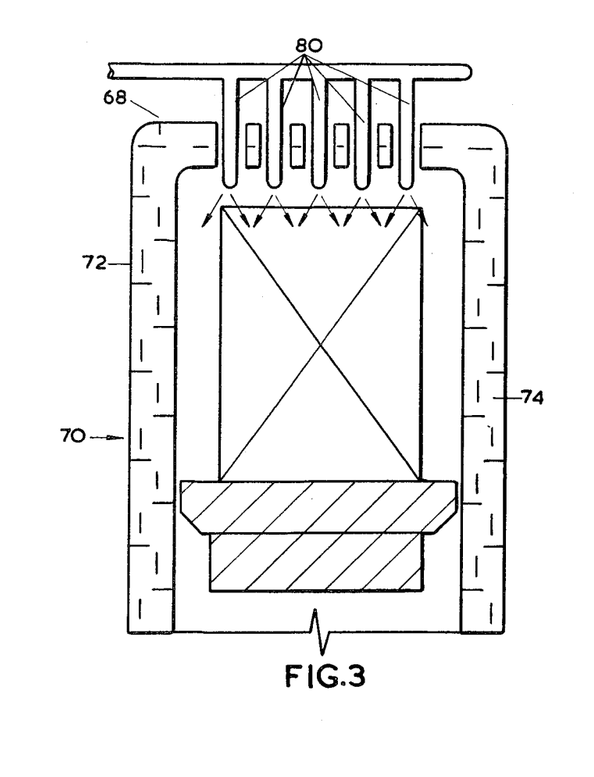
FIG. 3 is a schematic scrap view in partly sectioned elevation, of an intermittent-push roof-fired kiln fitted with lances for introducing oxygen into its interior.
Figure 4:
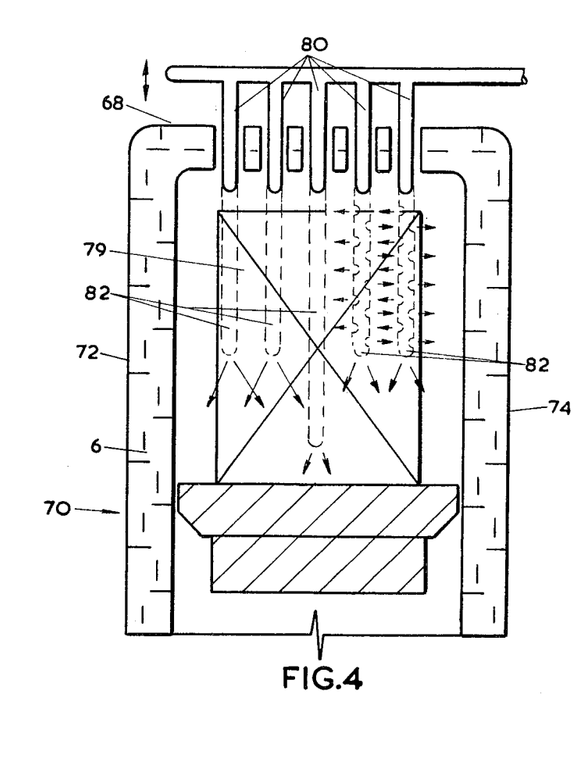
FIG. 4 is a schematic scrap view, in partly sectioned elevation, of a kiln shown in FIG. 3, illustrating how the positions of the oxygen lances may be adjusted.

With reference to FIGS. 3 and 4, the kiln shown is substantially the same as that shown in FIGS. 1 and 2 except that burners (not shown) enter the kiln through its roof 18. Similarly, the oxygen lances also enter the kiln through its roof 68. The kiln which is indicated generally by a reference number 70 has side walls 72 and 74. There is a single row of five lances 80 extending through the roof 68.

In operation of the kiln, firing dykes are left between parts of individual settings or between entire settings. The kiln cars are advanced through the kiln intermittently. Each "push" moves each kiln car a further half car's length forward. The pushes are arranged so that at the end of each push the oxygen lances 80 direct oxygen into a firing dyke 79. As shown in FIG. 4, each lance may be moved downwards into the interior of the kiln into positions shown by the dotted lines 82 in FIG. 4. The lances 80 are adapted in their extended positions to direct streams of oxygen into the firing dyke 79 at spaced apart locations along the entire height of the dyke. Thus there is penetration of oxygen into the setting in accordance with the invention and analogously to that described with reference to FIGS. 1 and 2.

In other respects, the operation of the kiln shown in FIGS. 3 and 4 is similar to that shown in FIGS. 1 and 2.

In the kilns shown in FIGS. 1 to 4, oxygen-rich gas and the combustion products of a burner are not simultaneously directed into the same space between adjacent stacks of bricks. Typically, a plurality of oxygen lances may be arranged in a row between rows of burners.

Figure 5:
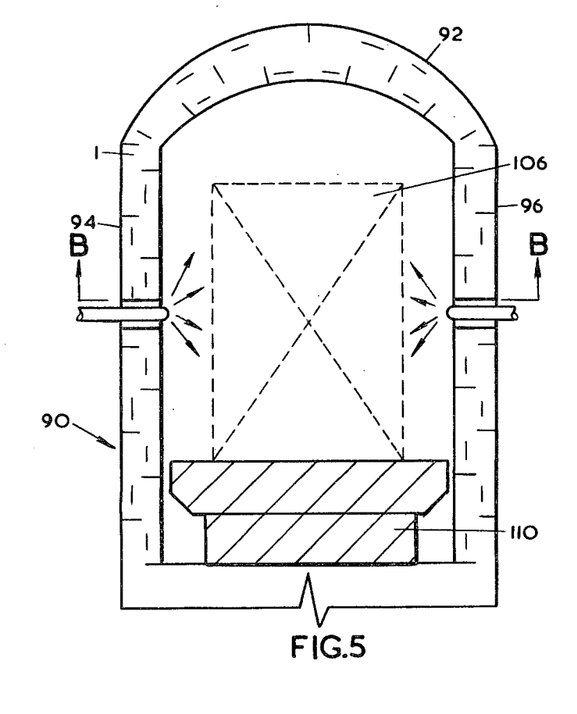
FIG. 5 is a schematic scrap view; in partly sectioned elevation, of a continuous push side-fired tunnel kiln fitted with oxygen lances for introducing oxygen into its interior.
Figure 6:
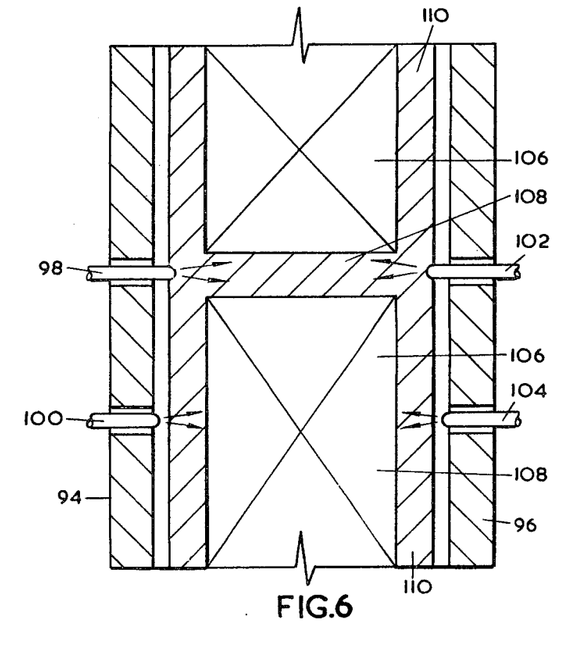
FIG. 6 is a section taken along part of the length of the kiln through the line B—B in FIG. 5.

With reference to FIGS. 5 and 6, continuous-push side-fired kiln 90 has a roof 92, a floor (not shown) and side walls 94 and 96.

The operation of this continuous-push kiln is similar to that of the intermittent-push kilns illustrated in FIGS. 1 to 4. However, in a continuous push kiln, there are no firing dykes as such. This is because the burners (not shown) fire either into a false deck with flue ways on the kiln cars or into a combustion chamber mounted on each side of the kiln in a firing region. The region in which oxidation takes place is located entirely or largely upstream (in respect of the movement of the kiln car) of the burner zone. In the oxidation region are located four oxygen lances. Two such lances 98 and 100 extend through the wall 94 of the kiln 90 and the other two lances 102 and 104 extend into the kiln through the wall 96. All the lances have their axes lying in the same horizontal plane bisecting the settings, which are indicated in FIGS. 5 and 6 by reference 106. As shown in FIG. 6, each setting 106 is made of more than one pile and a space or channel is defined between separate piles of bricks. This channel is shown by the reference 108 in FIG. 6. It extends transversely to the direction in which the kiln cars are pushed.

Since there is a continuous push, it is not possible to use lances which are capable of being extended into firing dykes or spaced between adjacent stacks of bricks. Consequently, the lances 98, 100, 102 and 104 are of a kind which is capable of giving a particularly high velocity stream or jet of oxygen which diverges in a vertical plane.

The spacing between the lances 98 and 100 and between the lances 102 and 104 is typically a quarter of a kiln car's length.

In operation the lances direct high velocity streams of oxygen against the bricks in the setting. The oxygen penetrates into the setting and thus facilitates oxidation of carbonaceous material in accordance with the invention. In addition, the oxygen from the lances will enter the spaces between adjacent stacks of bricks when such spaces are aligned with each lance in turn, and the oxygen then penetrates the forward and rearward spaces of the stacks as well as the sides.

Figure 9:
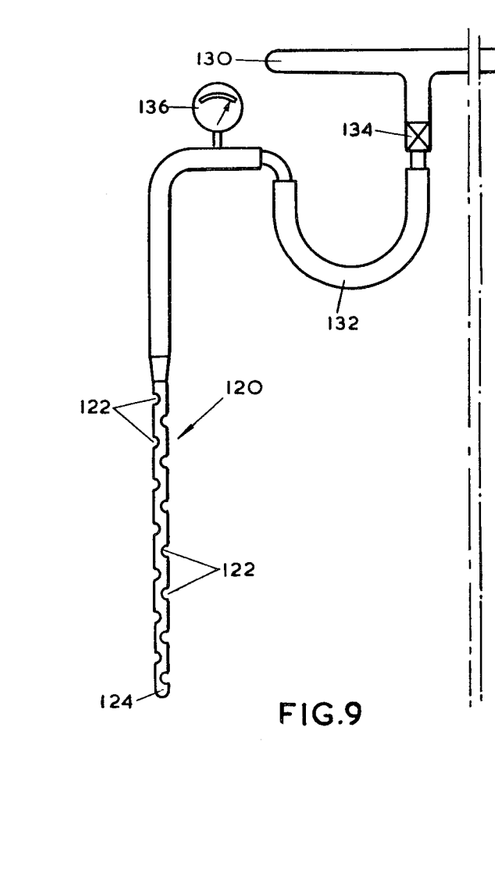
FIG. 9 is a schematic diagram illustrating one form of lance suitable for use in the kiln shown in FIGS. 1 to 6.

In FIG. 9 there is shown a typical lance for use in the kiln shown in FIGS. 1 to 4. The lance 120 has along its length several apertures 122 and also has an open end 124. In operation, streams of oxygen pass out of the apertures 122 and the open end 124. The apertures are arranged so as to give divergent streams. In view of the relatively large number of apertures 122, the lance shown in FIG. 9 is not capable of producing a very high velocity jet of oxygen.

As shown in FIG. 9, a lance 120 is typically connected to an oxygen manifold 130 by means of flexible connector 132. Typically there is a control valve 134 in manifold 130 to enable the rate or oxygen passage into the individual lance 120 to be adjusted. This can be done in conjunction with a pressure gauge 136 in communication with the upstream end of the lance 120.

Figure 10:
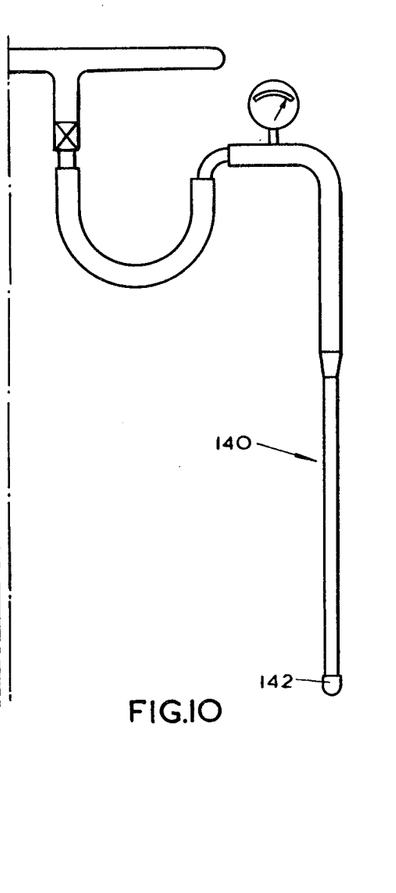
FIG. 10 is a schematic diagram illustrating one form of lance suitable for use in the kilns shown in FIGS. 1 to 6.

With reference to FIG. 10, a typical lance for use in the kiln as shown in FIGS. 5 and 6 is illustrated. The lance 140 is fitted with a nozzle 142 at its outlet end. Unlike the lance shown in FIG. 9, there are no apertures along the length of the body of the lance shown in FIG. 10.

Figure 11:
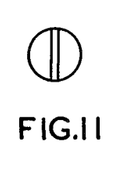
FIG. 11 is a schematic end view of a nozzle forming part of a lance shown in FIG. 8.
Figure 12:
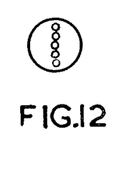
FIG. 12 is an end view of another form of nozzle suitable for use in the lance shown in FIG. 8.

In FIGS. 11 and 12 are shown nozzles which may be fitted to the end of the lance shown in FIG. 10. The outlet velocity from each nozzle may be in the range 0.25 to 1 Mach. The lance shown in FIG. 11 is of the so-called "fish-tail" type. Its outlet is provided by a slot formed through the nozzle. It is adapted to give a uniform jet of oxygen which diverges in a plane in which lies the longitudinal axis of the slot. Typically, the jet has an arc of up to 120°. In FIG. 12 is shown an alternative nozzle which instead of a single opening extending along its diameter there is a series of small apertures positioned along its diameter. These individual apertures give separate oxygen streams capable of covering an arc similar to that covered when the nozzle shown in FIG. 11 is used.

Figure 7:
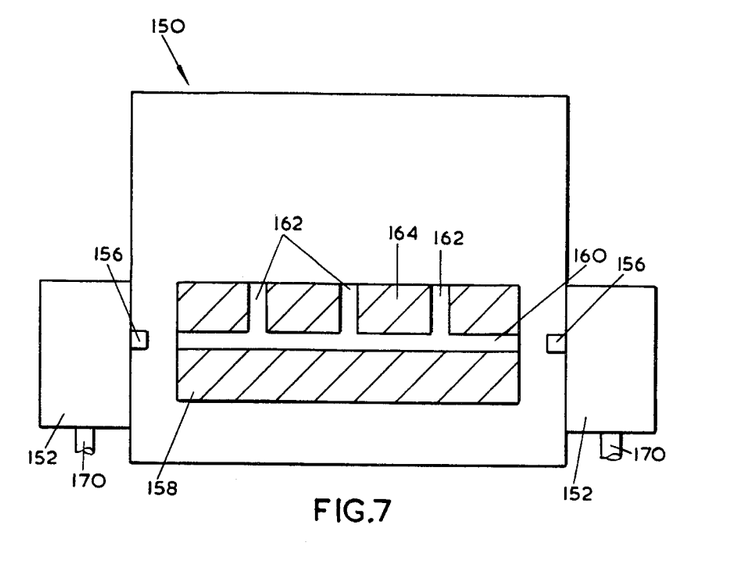
FIG. 7 is a partly sectioned schematic elevation of a continuous-push kiln containing a kiln car with passages for air therein.

An alternative method of achieving penetration of oxygen-rich gas in stacks of bricks advancing continuously through a tunnel kiln is now described with reference to FIGS. 7 and 8. This method is applicable to kilns whose cars are designed with passages for the flow of gas therethrough. With reference to FIG. 7, kiln 150 has external burners (not shown) whose combustion products (hot gases) pass through chambers 152 into a kiln 150 through inlets 156. The gas leaves the chamber 152 at a relatively high velocity such that it is able to penetrate well into the interior of the kiln.

Figure 8:
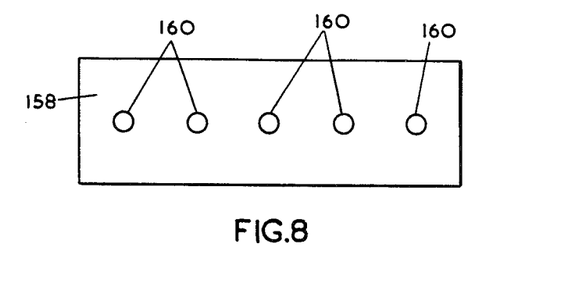
FIG. 8 is a schematic side view of the kiln car shown in FIG. 7.

As shown in FIGS. 7 and 8, each kiln car 158 is formed of horizontal passages 160 going from side-to-side of its body 162. The passages 160 are on the same level as the inlets 156 and such is the velocity of the combustion gases that they flow into and through the passages 160. Each passage 160 serves as an inlet to several vertically spaced apart outlets 162 which terminate in the floor 164 of the kiln cars. Thus, combustion gases from the burner are able to penetrate into the stack of bricks (not shown) on the floor 164 of each kiln car in turn as it passes the inlets 156.

In order to achieve penetration of oxygen-rich gas into the stacks of bricks, commercially pure oxygen is injected through the pipes 170 into the chambers 152. Thus, oxygen is carried with the combustion gases into the passages 160 and thereby penetrates the stack of bricks on each kiln car and in turn through the outlets 162.

Typically in the kilns shown in FIGS. 1 to 8, the rate of flow of oxygen-rich gas into the oxidation region is in the range 50 to 200 cubic meters per hour, and preferably in the range 75 to 200 cubic meters per hour. It is typically at least 2.5 cubic meters per 100 bricks when the kiln is used to fire bricks of standard size (i.e. 100 mm by 65 mm by 220 mm).

Preferably, sufficient oxygen-rich gas is added to increase to at least 12% by volume the oxygen concentration in a channel between stacks of bricks for the time being in the oxidation region of the kiln, such oxygen concentration being that at the level of the bottom of the stacks.

Figure 13:
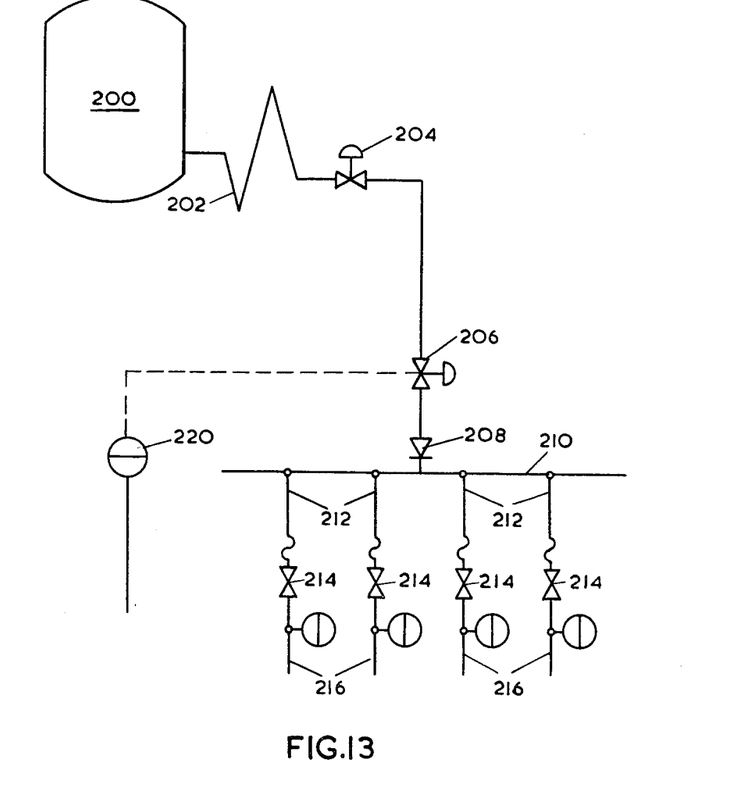
FIG. 13 is a schematic diagram illustrating means for controlling supply of oxygen to the lances of a kiln.

In FIG. 13 is shown an oxygen supply system for use in a kiln as described with reference to FIGS. 1 to 6 of the accompanying drawings.

The system comprises a vacuum-insulated liquid oxygen storage vessel 200, an evaporator 202 in communication with the outlet of the storage vessel 200 and suitable valve means 204 for controlling the supply of the vaporised oxygen from the evaporator 202. The evaporator is able to be put into communication by operation of the valve 204 with a flow control valve 206. The flow control valve 206 controls the rate of flow of oxygen into a manifold 210. Leading from the manifold 210 are four passages 212. In each passage is a balancing valve 214.

Associated with the valve 206 is an oxygen controller 220. This is a device which is adapted to receive a sample of oxygen from a chosen position within the kiln (typically at the level of the lower most bricks and in a firing dyke into which oxygen-rich gas is introduced) to generate an electrical signal representative of the oxygen concentration in the sample. The valve 206 is programmed such that the flow rate of the manifold is adjusted so as to compensate for changes in the sensed oxygen concentration. Accordingly, this concentration may be kept near to a chosen value (for example 15% by volume of oxygen). The balancing valve can be adjusted so as to vary the individual flow rates of oxygen through the lances 216 in communication with the interior of the kiln.

If desired, the means for introducing the substantially pure oxygen into the kiln may be part of a fully automated kiln control system.

DEPLETION OF THE ATMOSPHERE IN OXYGEN UPSTREAM OF THE ZONE WHERE OXYGEN IS ADDED

Figure 14:
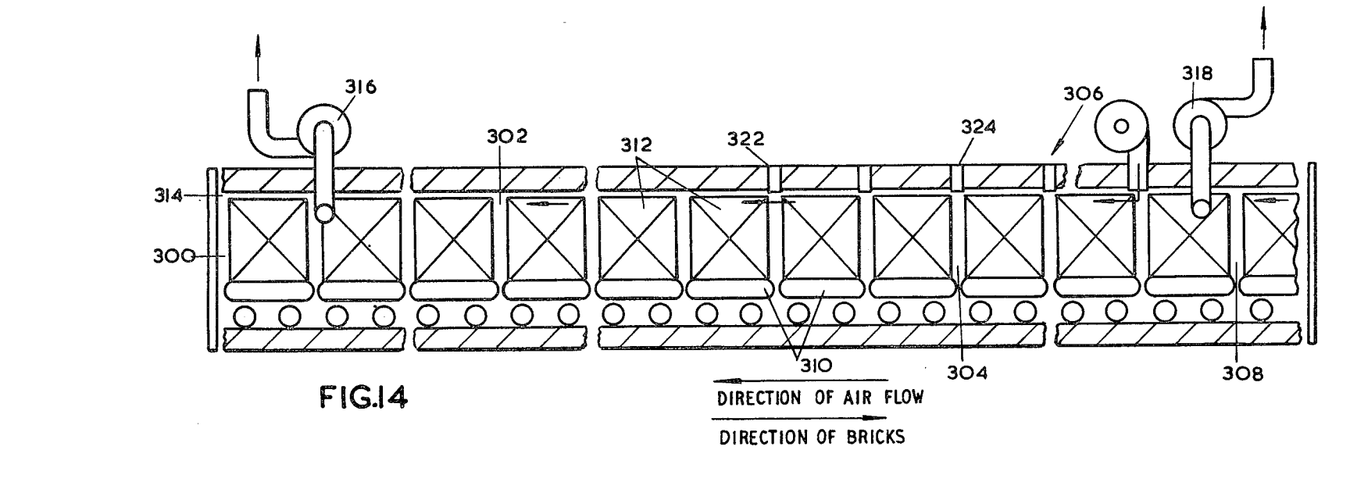
FIG. 14 is a schematic diagram showing a tunnel kiln.

Referring now to FIG. 14, kiln 300 has a preheating zone 302, a firing zone 304 in which burners 306 are located, and a cooling zone 308 (only a part of which is shown). Kiln cars 310 are adapted to advance stacks of bricks 312 through the kiln in the direction shown by the arrow 314. An air flow countercurrent to the passage of the bricks up to the end of the burner zone is created by operation of fan 316. In addition, an air flow through the cooling zone of the kiln 300 is created by fan 318, which flow passes to driers (not shown) in which the bricks are dried before admission to the preheating zone of the kiln.

As bricks enter the preheating zone 302 they encounter hot air flowing countercurrently thereto. This raises the temperature of the bricks. Typically, the temperature of the bricks is raised from about 150° C. when they enter the preheating zone to a temperature of about 750° C. at the end of the zone 302. The end of the zone 302 may be considered to be defined by a first row of burners 322 (only one shown in FIG. 14) in the group of burners 306. Oxygen is typically injected into the kiln intermediate the first row of burners 322 and a second row of burners 324 (only one shown in FIG. 14).

Proceeding in the direction of the air flow, the concentration of oxygen in the kiln atmosphere falls from about 21% in the cooling zone to a lower value in the burner zone 304. The introduction of commercially pure oxygen into the burner zone between the rows of burners 322 and 324 increases the oxygen concentration. However, progressing into the preheating zone 302, the concentration of oxygen falls again until it reaches a minimum. Then, owing to inflow of air into the kiln through seals (not shown) between the kiln cars and kiln walls again to 21% by volume.

Not only does the oxygen concentration in the kiln atmosphere vary along the kiln. It also varies vertically. Particularly in the burner zone 304, there is a tendency for the concentration of oxygen in the atmosphere between adjacent settings to be lower at the level of the floors of the kiln cars than at the level of the top of the settings.

Figure 15:
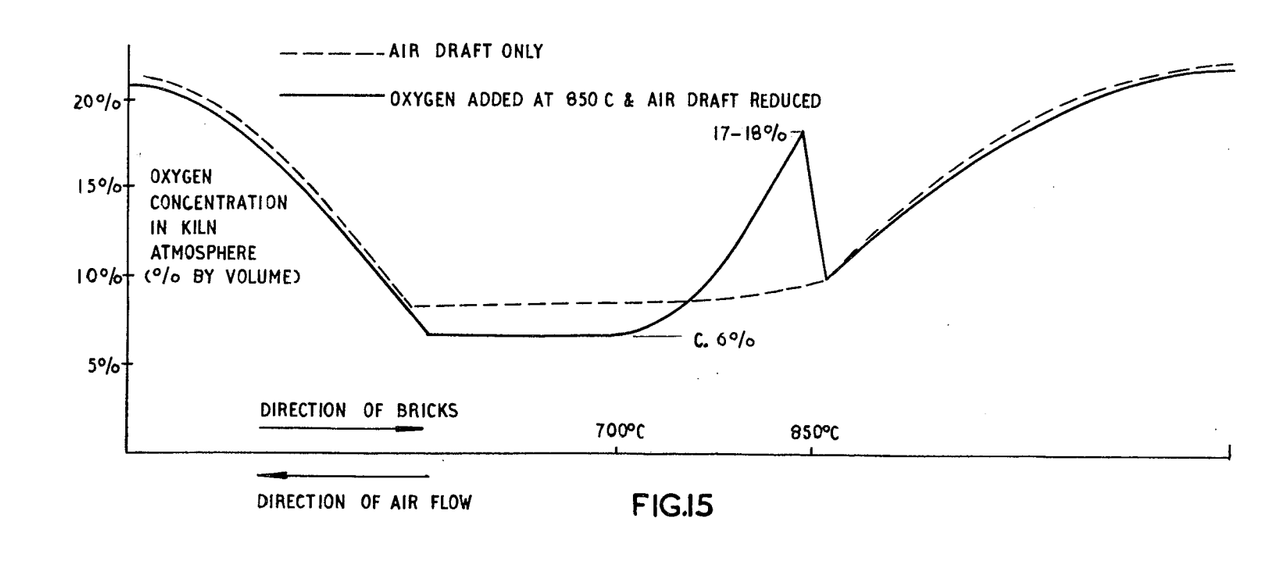
FIG. 15 is a graph illustrating the variation in oxygen in the atmosphere of the kiln shown in FIG. 14.

The variation in oxygen concentration with temperature and hence position along the kiln is shown in FIG. 15. The oxygen concentration referred to along the y-axis (or ordinate) of the graph shown in FIG. 15 is that at the level of the bottom layer of bricks in the setting.

The effect of adding the oxygen-rich gas between the burners 322 and 324 (in one of the ways previously described herein) is to increase the oxygen concentration between adjacent stacks or settings of bricks. As shown in FIG. 15, the oxygen concentration is typically increased from about 10% by volume to 17 to 18% by volume although the increase need not be as marked as this. (For example, it could be increased to, say, 14% by volume or more).

It is an advantage of the method according to the invention that the total flow of gas through the preheating zone can be arranged to be lower than that which would be necessary were the kiln to be operated in a substantially conventional manner without introduction of oxygen-rich gas between the first two burner groups. The dotted line in FIG. 15 shows a typical profile of the oxygen concentration (at the level of the lowest bricks in a setting) when the kiln is operated conventionally without addition of oxygen rich gas. Since the kiln can be operated in accordance with the invention using lower air flows through the kiln than would be otherwise be desirable, lower minimum oxygen concentrations are attained in the preheating zone 302 than when the kiln is operated conventionally. In addition, relatively more air may be passed by fan 314 to the driers without deleterious effect than would be the case were the kiln to be operated in a conventional manner without the aforementioned addition of substantially pure oxygen.

The temperature of the bricks at the region where oxygen in introduced is typically in the order of 800° C. or, as shown in FIG. 15, 850° C. It is to be appreciated that immediately downstream of the burners (in respect of the direction of atmosphere flow) the oxygen concentration falls rapidly in the direction of the inlet to the kiln and reaches a minimum of about 6% by volume (at the level of the lowermost bricks) at a temperature of about 700° C. Thus, owing to the atmosphere being relatively depleted in oxygen at temperatures from 600° C. up to about 750° C. or 800° C., the rate of oxidation of such carbon at such temperatures is limited and, accordingly, at least 50% of the oxidation takes place in a region in the kiln where the temperature of the kiln atmosphere is above 750° C. and typically in the range 750° C. to 850° C. It is found that confining most of the oxidation of the carbonaceous material within this temperature range has the effect of promoting vitrification of the material in the bricks. Thus, less heat is required for full firing of the bricks. It is therefore possible to make reductions in the amount of fuel supplied to the burners 306 without altering the push-rate through the kiln. Alternatively, the push-rate can be increased without deleterious effect on the quality of the resultant bricks. After the bricks have passed through the burner zone they are cooled by ambient air in the section 308 of the kiln.

In the lower temperature region of the preheating zone volatile compounds of carbon are driven off. This typically takes place at a temperature in the range 150° C. to 300° C. Between about 400° C. and about 600° C. water of crystallisation is driven off. During the phase in which water of crystallisation is driven off, substantially no carbon in the bricks is oxidised. Once evolution of water of crystallisation is complete then carbon in the bricks starts to be oxidised. The rate of oxidation is dependent on the temperature of the bricks and on the percentage by volume of oxygen in the kiln atmosphere.

Figure 16:
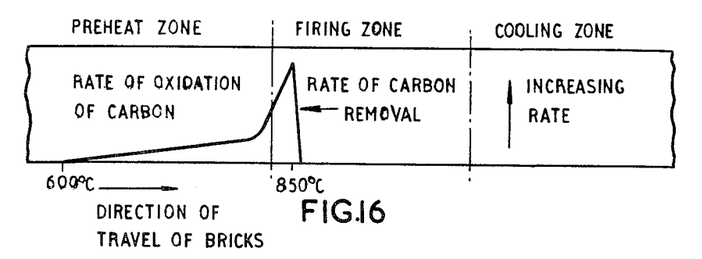
FIG. 16 is a graph schematically illustrating the variation in the rate of oxidation of the bricks as they advance through the kiln in a method of operating the kiln shown in FIG. 14 in accordance with the invention.
Figure 17:
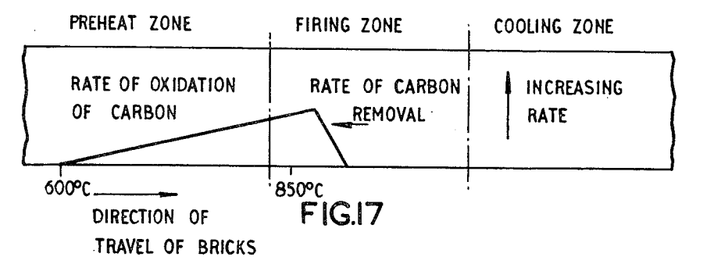
FIG. 17 is a graph schematically illustrating the variation in the rate of oxidation of the bricks as they advance through the kiln in a method of operating the kiln shown in FIG. 14 conventionally without addition of substantially pure oxygen.

The variation in the rate of oxidation of carbon as the bricks travel through the kiln is shown schematically in FIGS. 16 and 17. FIG. 16 illustrates the variation when the kiln is operated in accordance with the invention. FIG. 17 illustrates the variation when the kiln is operated conventionally, i.e. with no addition of substantially pure oxygen (or oxygen-enriched air) to the firing zone. There are two main differences between oxygen concentration in the kiln as illustrated in FIG. 15. First, because the oxygen concentration is markedly higher in the initial part of the firing zone when substantially pure oxygen (or oxygen-enriched air) is added to the kiln, the rate of oxidation increases from just before this zone much more rapidly than if the kiln is operated conventionally. Accordingly, a maximum rate of carbon burnout or oxidation is reached more quickly when the kiln is operated in accordance with the invention than when it is operated conventionally. Once this maximum has been acquired the rate will fall more rapidly than when the kiln is operated conventionally as remaining carbon is more readily oxidised when the kiln is operated in accordance with the invention. Because the air flow is typically reduced when the kiln is operated in accordance with the invention, the concentration of oxygen in the kiln atmosphere between 600° C. and typically about 750° C. is less than what it is in the same region when the kiln is operated conventionally. Accordingly, in this region the rate of oxidation is rather than less what it is when the kiln is operated conventionally. The combined effect of depleting the oxygen content of one region of the kiln atmosphere (i.e. between about 600° and about 750° C.) and enriching the kiln atmosphere in oxygen in an adjacent region (between about 750° C. (preferably 800° C. and about 850° C.) is to bring about, in the temperature range 750° or 800° to 850° C., burnout or oxidation of a much greater proportion of the carbon (i.e. organic material) present in the bricks at 600° C. than is the case when the kiln is operated conventionally. Typically, at least 50% by weight and, for example, about 60% by weight of such carbon is oxidised within a temperature range of 100° C. when the kiln is operated in accordance with the invention. This range is preferably between 750° C. and 850° C. Since the oxidation of carbon is exothermic, there will be a greater quantity of heat released from the bricks in this temperature range than there is when the kiln is operated conventionally. This phenomenon is illustrated schematically in FIGS. 18 and 19. The rate of heat release when the kiln is operated in accordance with the invention is shown schematically in FIG. 18. The rate of heat release when the kiln is operated conventionally is shown in FIG. 19.

Figure 18:
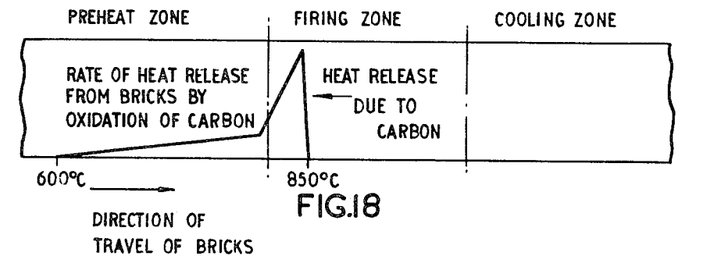
FIG. 18 is a graph schematically illustrating the variation in the rate at which heat is released from the bricks as they advance through the kiln shown in FIG. 14 when operated in accordance with the invention.
Figure 19:
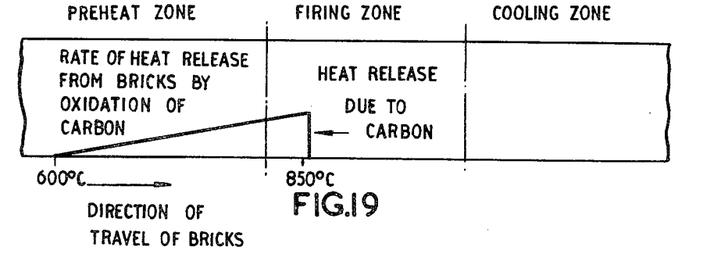
FIG. 19 is a graph schematically illustrating the variation in the rate at which heat is released from the bricks as they advance through the kiln shown in FIG. 14 when that kiln is operated conventionally without addition of substantially pure oxygen.

By confining oxidation of at least 50% by weight of the carbonaceous material present at 600° C. to a relatively narrow temperature range there is a rapid release of heat as shown in FIG. 18. This serves to raise the temperature of the bricks and thus facilitates oxidation of the carbonaceous material. Moreover, heating the inner bricks within a stack in this manner helps to counteract any tendency for the outer bricks to act as an insulating means that prevents the inner bricks from being raised by the burners or kiln atmosphere to the temperature of the outer bricks and that thereby reduces the rate of oxidation of carbonaceous material from the inner bricks.

It is to be appreciated therefore that the method according to the invention makes possible fuel savings in three distinct ways. First, with reference to FIG. 14, more hot air may be diverted from the interior of the kiln 300 to the driers (not shown) by fan 318, thereby making possible a reduction in the amount of fuel that has to be burnt in order to drive off moisture from the bricks. Second, the fan 316 may be adjusted to induce typically 10 or 20% by volume less air into the kiln (typical conventional flows are from 30,000 to 40,000 cubic meters per hour), thus reducing the volume of gas that needs to be heated by the kiln burners, thereby making possible a reduction in the amount of fuel that has to be burnt in order to heat the kiln atmosphere. Third, more heat is released in the burner or firing zone by the bricks, thereby making possible a reduction in the amount of fuel that needs to be burnt by the burners in order to heat the kiln atmosphere. It is to be appreciated that, if desired, the rate of fuel consumption may be maintained constant (when converting a conventional kiln to operation in accordance with the invention) and instead a faster rate of throughput of bricks may be achieved. Alternatively, both production increases and fuel savings may be aimed at.

By way of further example, if a tunnel kiln of the roof-fired, intermittent-push kind is conventionally operated in the manner set out in Table 1 below, by reducing the air flow by 10% and adding commercially pure oxygen at a flow rate of 85 cubic meters per hour to the oxidation zone at a region where its temperature is about 850° C., the results shown in Table 2 may be achieved.

It is assumed for the purpose of Table 2, that the commercially pure oxygen is introduced into a single firing dyke in which, without adding such commercially pure oxygen, the atmosphere would contain at kiln car deck level 6% by volume of oxygen, at a level of about half way up the adjacent settings 9% by volume of oxygen, and at the level of the adjacent tops of settings about 14% by volume of oxygen. The addition of the commercially pure oxygen and the reduction by 10% of the air flow would increase the oxygen concentration in the dyke to make it relatively uniform from top to bottom and in order of 13 to 14% by volume.

It will be seen from Table 2 that an increase in the rate of production and a decrease in fuel consumption can both be achieved.

The temperatures referred herein are those of the atmosphere above the bricks or other ware. The temperature of the atmosphere at any point above a stack or setting does not generally differ substantially from the temperatures of the bricks at the top of that stack or setting.

Various changes in form and details may be made without departing from the spirit and scope of the present invention. Consequently, it is intended that the appended claims be interpreted as including all such changes and modifications.

TABLE 1

| Fuel | Natural gas |
|---|---|
| Maximum temperature | 1035° C. |
| Setting dimensions | 3m wide × 1.7m high × 1.7m long |
| Average carbon in clay | 2.5% by weight |
| Loss of weight on ignition | 8.75% |
| Perforations | 19% |
| Push rate (per full car) | 80 mins |
| Specific fuel consumption | 56 therms/1000 bricks (5900 MJ/1000 bricks) |
| Production (bricks per day) | 55,000 |

TABLE II

| Push rate (per full car) | 68 minutes |
|---|---|
| Specific fuel consumption | 49.75 therms/1000 bricks (5250 MJ/1000 bricks) |
| Production (bricks per day) | 63,250 |

What is claimed is:

1. A method of firing items of clay or refractory ware which are arranged in spaced apart stacks and are passed through a tunnel kiln having preheat, burning and cooling zones in the direction of travel of ware through the kiln comprising the steps of:
   passing air through the kiln in a direction countercurrent to the direction of travel of said stacks;
   operating burners disposed in said kiln burning zone to heat said ware to enable oxidation of carbon in the ware in an oxidation zone within the burning zone;
   introducing a flow of gas relatively enriched in oxygen in comparison to air into the oxidation zone at a rate such that an oxygen concentration of at least 12% by volume is maintained in the spaces between said stacks and said gas flow penetrates each stack of ware while in the oxidation zone; and
   maintaining the temperature in the oxidation zone between 750°–850° C. such that at least 50% of the carbon in said ware is oxidized in the oxidation zone.

2. The method defined in claim 1, in which at least some of the said oxygen-rich gas is introduced into a channel extending across the kiln and defined between adjacent stacks of ware for the time being in the oxidation region.

3. The method defined in claim 2, in which turbulence is created in said channel by the introduction of the said oxygen-rich gas.

4. The method defined in claim 1 wherein the temperature in the portion of the preheat zone adjacent the burning zone is between about 650°–750° C. and the oxygen concentration of gas in said portion of the preheat zone is at least 6%.

5. The method defined in claim 1 wherein said burners are disposed in rows and said oxygen enriched gas flow is introduced into the kiln between said rows of burners.

6. The method defined in claim 1, in which at least 2.5 cubic meters of oxygen-rich gas are introduced into the kiln per 1000 bricks.

7. The method defined in claim 6, in which the oxygen is introduced into the kiln through a plurality of lances each producing a divergent jet of gas.

8. The method defined in claim 1, in which the concentration of oxygen in said channel is monitored at the level of the lowest bricks, and the flow rate of oxygen-rich into the oxidation region controlled so as to maintain a monitored oxygen concentration of at least 12% by volume.

9. The method defined in claim 1, in which the stacks of bricks are advanced through the kiln on kiln cars which have passages which at one end terminate in the surface on which the ware is stacked and at the other end communicate with fuel burners, the oxygen-rich gas is introduced into such passage of a kiln car for the time being in the oxidation region of the kiln.

* * * * *